(12) United States Patent
Amar et al.

(10) Patent No.: US 6,956,919 B2
(45) Date of Patent: Oct. 18, 2005

(54) SINGLE CLOCK DATA COMMUNICATION IN DIRECT STREAM DIGITAL SYSTEM

(75) Inventors: Aryesh Amar, Austin, TX (US); Brian David Trotter, Austin, TX (US); Jason Powell Rhode, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 229 days.

(21) Appl. No.: 10/292,320

(22) Filed: Nov. 12, 2002

(65) Prior Publication Data

US 2004/0091063 A1  May 13, 2004

(51) Int. Cl.[7] .............................................. H04L 7/00
(52) U.S. Cl. ..................... 375/355; 375/316
(58) Field of Search ............................... 375/242, 316, 375/354, 355, 371, 247, 282; 341/143, 144; 327/291, 298, 299

(56) References Cited

U.S. PATENT DOCUMENTS

| | | | |
|---|---|---|---|
| 6,255,975 B1 * | 7/2001 | Swanson | 341/143 |
| 6,489,909 B2 * | 12/2002 | Nakao et al. | 341/144 |
| 6,646,582 B2 * | 11/2003 | Watanabe | 341/143 |
| 6,750,693 B1 * | 6/2004 | Duewer | 327/298 |

* cited by examiner

*Primary Examiner*—Chieh M. Fan
(74) *Attorney, Agent, or Firm*—James J. Murphy; Thompson & Knight

(57) ABSTRACT

Methods and apparatus are provided for receiving DSD data in phase modulation mode using a single clock signal. Either the bit clock or phase signal may be used.

20 Claims, 4 Drawing Sheets

SINGLE CLOCK DATA COMMUNICATION IN DIRECT STREAM DIGITAL SYSTEM

FIELD OF INVENTION

The present invention relates in general to receiving Direct Stream Digital (DSD) serial data and more particularly to methods and apparatus for receiving a DSD bit stream in phase modulation mode using a single clock signal.

BACKGROUND OF INVENTION

Multiple-bit pulse code modulation (PCM) is a widely used method of converting an analog audio signal into digital form for storage on a digital medium, such as a compact disk (CD). Generally, an analog-to-digital converter (ADC) samples the amplitude of the input analog signal at a given sampling rate (frequency) Fs to produce a stream of multiple-bit samples representing the amplitude value of the analog signal at each sample time. In standard CDs, the digital data are typically recorded with 16-bit samples and a 44.1 kHz sample rate; however, newer audio formats may use up to 24-bit samples and up to 192 kHz sample rates.

During playback, a digital-to-analog converter (DAC) subsystem converts the PCM samples back to an analog waveform. Delta-sigma DACs, based on a noise-shaping delta-sigma modulator and a following DAC output stage, have found widespread use because delta-sigma DACs generally provide high noise attenuation in the signal band and are relatively inexpensive to manufacture. Typically, prior to conversion, the PCM data are passed through an interpolation filter to increase the sample rate. Using oversampling, the delta-sigma modulator spreads the quantization noise power across the oversampling frequency band, which is typically much greater than the input signal bandwidth. Additionally, the delta sigma modulator performs noise shaping by acting as a lowpass filter to the input signal and a highpass filter to the noise; most of the quantization noise power is thereby shifted out of the signal band. The noise-shaped modulator output signal is ultimately converted to analog form by the output DAC stage, such as a switched-capacitor or current steering DAC.

A more recently developed digital recording system, known as "Super Audio CD" or "SACD", records the single-bit audio data stream output by a high-order, single-bit, delta-sigma modulator on a digital storage medium, similar to a DVD-type disk. This format is also commonly referred to as a Direct Stream Digital (DSD) format. In theory, a DSD bit-stream may be supplied directly to a delta-sigma DAC for conversion to an analog audio signal during playback without requiring any digital processing.

Two bit streaming modes, or protocols, have been specified for sending a DSD bit-stream to another device, such as a DAC. In the first or normal mode, a device sending the DSD bit-streams drives the data lines according to the value of the data bits being sent. A bit clock is provided to indicate when the data bits are valid. A receiving device may store the data bits on each rising edge of the bit clock.

The second mode, which is the phase modulation mode, is similar to the normal mode in that the sending device drives the data bits onto the data lines, but the data is stored on a falling edge of the bit clock signal. Furthermore, in the phase modulation mode, each data bit is sent as a pair of bits comprising the actual data bit followed by an inverted data bit. Thus, a '0' data bit is sent as a '0' followed by a '1', and a '1' bit is sent as a '1' followed by a '0'. A phase clock is provided to distinguish a data bit from its inverse. When the phase clock is low, the data bit is on the data line, whereas the inverted data bit is present when the phase clock is high.

The two modes of data transmission are further classified according to whether the receiving device provides the bit clock signal. When the receiving device is operating in slave mode the sending device provides the bit clock. On the other hand, the receiving device provides the bit clock when it is configured to operate in a master mode.

Transmitting the DSD bit streams using the phase modulation mode provides redundancy in the bit stream, which may provide some degree of robustness. However, the phase modulation mode requires two clock lines, which may be undesirable. For example, a design for an integrated circuit device may be constrained as to the total number of pins available and may be unable to accommodate two pins for the required clock signals. The need for two clock signals also increases the complexity of circuit boards and connectors and may cause problems with radiated electromagnetic interference.

Accordingly, it would be desirable to provide methods and apparatus for receiving phase modulated DSD bit streams in slave mode using only a single clock signal.

SUMMARY OF INVENTION

The principles of the present invention are embodied in circuits and methods for receiving a DSD bit stream in the phase modulated mode, and audio systems utilizing the same. The receiving circuitry uses either the bit clock or the phase clock in conjunction with the data signals to derive an internal signal that reliably indicates when the bits in the DSD bit stream are stable and may be read.

In a first embodiment of the invention, the circuitry derives the internal signal from the bit clock. A synchronization circuit synchronizes the internal signal with the bit stream to ensure the true data bits are read. In a second embodiment, the receiving circuitry uses a re-timing circuit to create an internal signal derived from the phase clock. In yet a third embodiment, the receiving circuitry is configurable to use either the bit clock or phase clocks to receive the DSD bit stream. The receiver circuitry includes the circuitry of the first and second embodiments. A configuration register is used to select which of the two circuits to use.

Circuitry embodying the inventive principles have substantial advantages over the prior art. For example, receiving circuitry using a single clock signal uses fewer pins in an integrated circuit package. In addition, devices or systems receiving bit-streams according to the principles of the invention require fewer signals to be routed between devices sending and receiving the DSD bit streams. These features may reduce the cost and complexity of products using the present invention.

BRIEF DESCRIPTION OF DRAWINGS

For a more complete understanding of the present invention, and the advantages thereof, reference is now made to the following descriptions taken in conjunction with the accompanying drawings, in which.

DETAILED DESCRIPTION OF THE INVENTION

The principles of the present invention and their advantages are best understood by referring to the illustrated embodiment depicted in FIGS. 1–10 of the drawings, in which like numbers designate like parts throughout.

Figure 1:
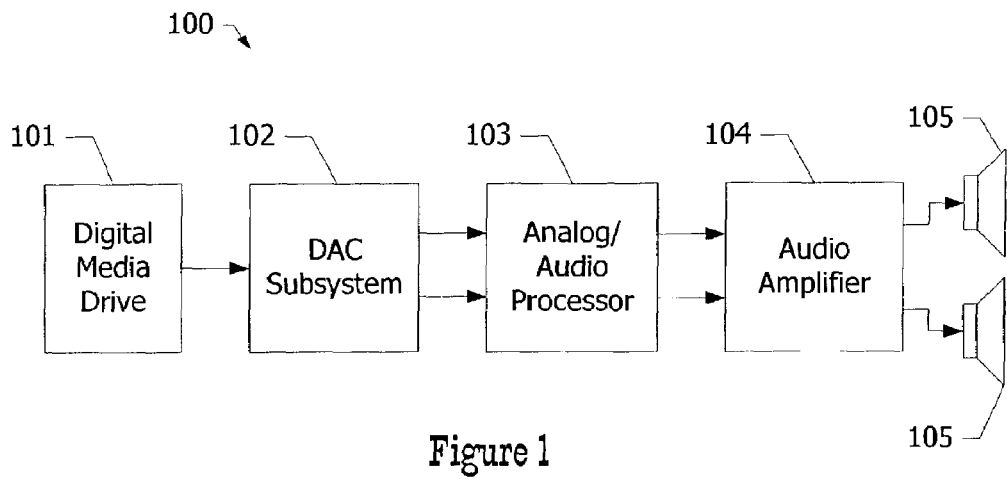
FIG. 1 is simplified block diagram of an exemplary digital audio processing system.

FIG. 1 is a simplified block diagram of typical digital audio system 100, which may be, for example, a home stereo system including a Super Audio Compact Disk (SACD) player. Digital audio system 100 includes digital media drive 101, which recovers a DSD bit stream from a digital media, such as an optical disk, and passes the data to Digital-to-Analog Converter (DAC) subsystem 102. In the illustrated embodiment, the bit stream is a stream of one-bit data as specified for the SACD format. Digital media drive 101 also passes control and timing signals (not shown) to DAC subsystem 102.

DAC subsystem 102 converts the bit stream into an analog signal corresponding to an audio signal to be reproduced. The analog signal is output to analog audio processor 103 for further processing before amplification by audio amplifier 104. Processing operations provided by analog/audio processor 103 include volume control, frequency equalization, and audio matrix decoding. Audio amplifier 104 receives the processed analog signal and amplifies it to a level suitable for driving speakers 105.

For convenience, the circuits in the illustrative embodiment of FIG. 1 are shown together as being subsystems in audio system 100. In alternate embodiments, however, the circuits of FIG. 1 need not be part of a single audio component. For example, digital media drive 101 may be a digital video disc (DVD) player, whereas DAC subsystem 101 and analog audio processor 103 may be part of an audiovisual (A/V) control amplifier, and audio amplifier 104 may be a standalone audio power amplifier. Additionally, switching circuitry may be provided at the input of DAC subsystem 102 to enable the user to select among alternate sources of digital audio data, e.g., CD, DAT (digital audio tape), DVD players.

Figure 2:
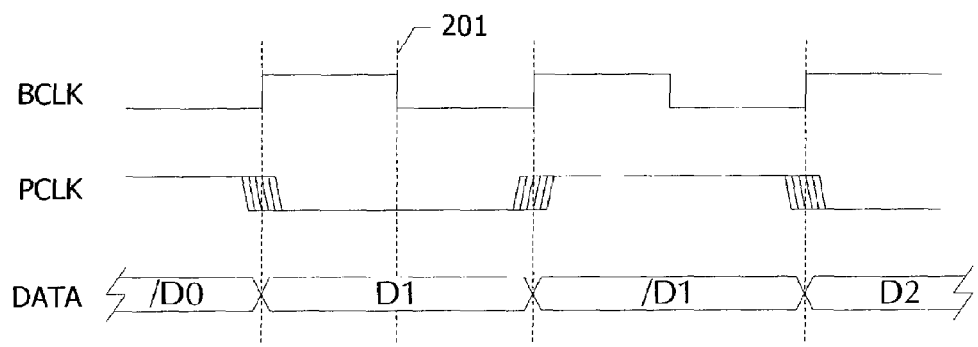
FIG. 2 is a timing diagram showing the signals used for sending a DSD bit stream in the phase modulated mode.
Figure 3:
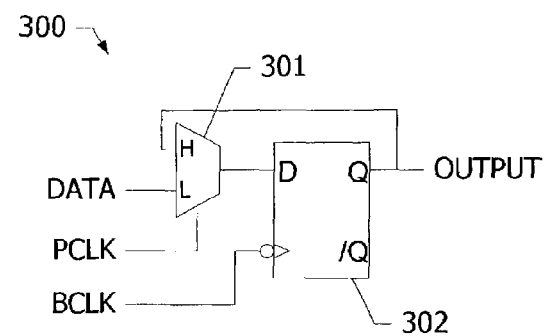
FIG. 3 is a simplified schematic of a circuit for receiving data at the DAC subsystem of FIG. 1 in the phase modulation mode when bit clock BCLK and phase clock PCLK are both available.

In accordance with the principles of the present invention digital media drive 101 sends the DSD bit stream to DAC subsystem 102 using the phase modulation mode, with DAC subsystem 102 configured to operate in slave mode. FIG. 2 is a timing diagram showing the transfer of data according to the DSD phase modulation protocol. For clarity, only a single data line is shown in the Figures however, it is to be understood that there are two or "multiple of 2" such bit lines.

Referring to FIG. 2, a single bit is transmitted during each cycle or period, of the bit clock, BCLK. The DATA line may change state on the rising edge of BCLK but is stable on the negative edge of BCLK. A receiving device may use the negative edge of BCLK to store data on the DATA line. According to the protocol for phase modulation mode, each data bit is sent twice. During a first bit period the actual bit value is sent, e.g. D1 and D2, and during the following bit period, the complement of the bit value is sent, e.g. /D0 and /D1. The bit value and its complement are distinguished by the value of the phase clock PCLK.

When both clocks are present, it is trivial to store the data bits in a receiving device. A suitable circuit 300 for receiving data at DAC subsystem 102 (e.g., receiving or front end of DAC subsystem 102) of FIG. 1 in the phase modulation mode is show in FIG. 3. Circuit 300 includes multiplexor 301 and D-type flip-flip, 302. BCLK is connected to the clock input of flip-flop 302 so that a negative or falling edge on BCLK causes flip-flop 302 to store the value at the D input. The stored value is provided at the Q output of the flip-flop. An inverted value is provided at the /Q output. Multiplexor 301 is connected to select the input to flip-flop 302 depending on the value of PCLK. When PCLK is low, the signal on the "L" input is passed through to the D input of flip-flop 302. However, the signal on its 'H' input is passed through to the input of flip-flop 302 when PCLK is high.

The DATA line is connected to the "L" input of multiplexor 301. When PCLK is low, the state of the DATA line is passed though to flip-flop 302 and stored on the negative edge of BCLK. This event corresponds to time 201 in FIG. 2. The 'H' input of multiplexor 301 is connected to the output of flip-flop 302. Accordingly, when PCLK is high, the output of flip-flop 302 is fed back to its input. This event causes flip-flop 302 to retain its previous state whenever PCLK is high. Thus, circuit 300 of FIG. 3 stores the data bits when PCLK is low, corresponding to the true value of the data bits being transmitted, e.g., D1 and D2, and keeps its state when PCLK is high, corresponding to the bit period when the data bits are inverted, e.g., bit /D0 and /D1.

When only one of the two signals BCLK and PCLK is available, it is more difficult to reliably read the true data bits. For example, when only BCLK is provided, it is possible to reliably store each bit in the DSD bit stream. However, without PCLK no signal exists to distinguish a true bit value from an inverted bit value. Similarly, when only PCLK is provided, it is possible to distinguish a true bit value from an inverted bit value. However, without BCLK, no signal exists to indicate when the data bits are valid and should be stored.

In accordance with the principles of the present invention, a device is able to receive a DSD bit stream using only one of the signals BCLK and PCLK. The device includes additional circuitry to internally generate a signal to replace the functionality of the missing signal. Preferably, a device such as DAC Subsystem 102 of FIG. 1, constructed in accordance with the present invention is configurable to use either BCLK or PCLK. In one embodiment of the present invention, the value of a bit in a configuration register determines which of signals BCLK and PCLK is being provided.

In a first embodiment, the circuitry of the present invention is configured to operate using BCLK without PCLK. As described above, the value of DATA may be stored on the falling edges of BCLK because the data is stable at that time. However, the data and its inverse are transmitted on consecutive cycles of BCLK, so that the data should only be stored on every other falling edge of BCLK. Circuit 400 of FIG. 4, includes flip-flop 401 connected between BCLK and the select input of multiplexor 402. Flip-flop 401 is configured to divide the frequency of BCLK by two. As shown in the timing diagram of FIG. 5a, the BCLK/2 signal may be used to distinguish true data bits from inverted data bits in the same manner as the PCLK signal in FIG. 2.

However, the polarity of BCLK/2 with respect to the data bits depends on the initial conditions of flip-flop 401. For example, if flip-flop 401 is initially set so its output is high, BCLK/2 may have the polarity shown in FIG. 5a. However, if flip-flop 401 is initially set so that its output is low, then BCLK/2 may have the polarity shown in FIG. 5b. If the polarity of BCLK/2 is a shown in FIG. 5a, the true bit values will be stored by flip-flop 403. A BCLK/2 with the polarity shown in FIG. 5b results in the inverted bit values being stored. Because it may be important for subsequent processing to know whether the data is inverted, it is necessary to force BCLK/2 to have the desired polarity.

By analyzing the sequence of bits on the DATA line, flip-flop 401 may be synchronized to the bit stream so that BCLK/2 has the desired polarity. A stream of alternating ones and zeros, such as . . . 1010101 . . . on the DATA line can either be interpreted as the ones being the true data bits and the zeros being the inverted bits or as the zeros being the true data and the ones being the inverted data. Thus, an alternating pattern provides no useful information for synchronizing flip-flop 401 to the DSD bit stream. However, a bit pattern including a pair of repeated bits is utilized to provide the necessary synchronization. For instance, a pattern of . . . 1001 . . . is interpreted such that the first one and the second zero are the true bit values, and the first zero and the second one are the inverted values. A bit pattern including . . . 0110 . . . would be interpreted such that the first zero and second one are the true bit values, and the first one and the second zero are the inverted values. In short, two consecutive 1's or 0's in the DSD bit stream provide the necessary information to start or synchronize flip-flop 401.

Figure 6:
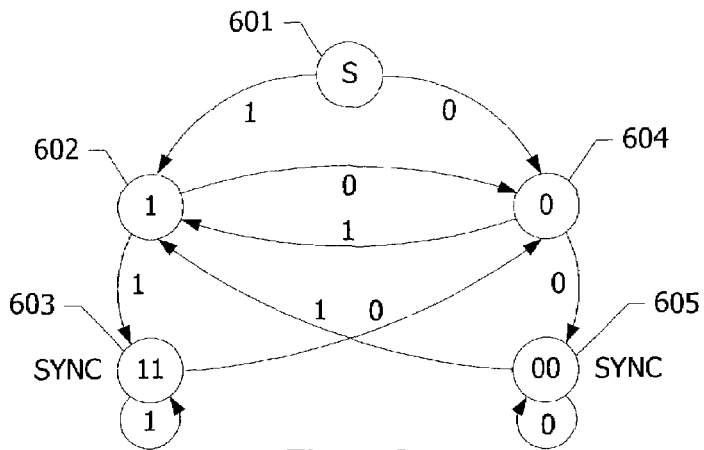
FIG. 6 is a transition diagram for a finite state machine for synchronizing the circuit of FIG. 4.

In one embodiment of the invention, a finite state machine (FSM) is implemented to monitor the bit stream on the DATA line. When two consecutive bits have the same value, a SYNC signal is generated to start flip-flop 401 in the correct state. A simplified state diagram for such a FSM is shown in FIG. 6. The FSM starts in state 601 from which a '1' bit in the DSD bit stream causes a transition to state 602. A second '1' bit in the DSD bit stream causes a transition to state 603 and the generation of a SYNC signal. Thus, State 602 corresponds to having received a single '1' bit, and state 603 represents having received at least two '1' bits in a row.

Receiving a '0' bit while in any of states 601, 602, or 603, causes a transition to state 604. State 604 represents having received a single "0" bit. Receiving a second '0' bit causes a transition to state 605 and the generation of a SYNC signal. Thus, state 615 represents having received two or more consecutive "0" bits. Receiving a "1" bit in either of states 604 or 605 result in a transition to state 602.

Figure 7:
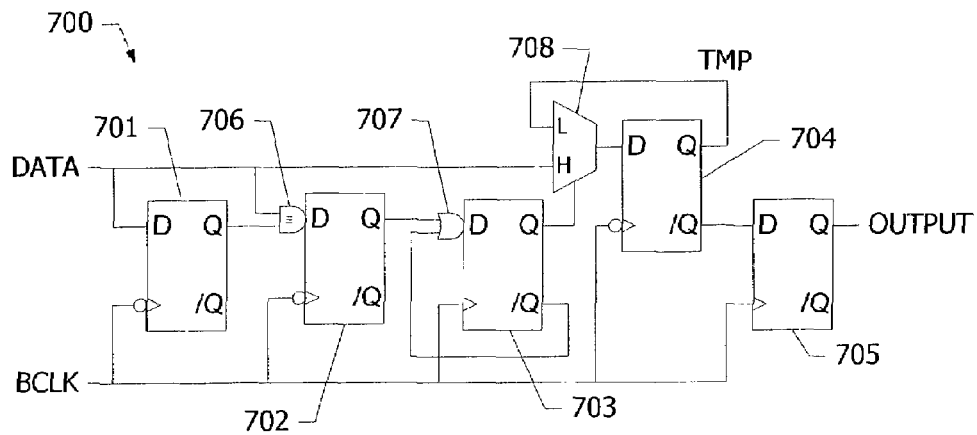
FIG. 7 is an embodiment of the circuit of FIG. 4 including a synchronization circuit.
Figure 8:
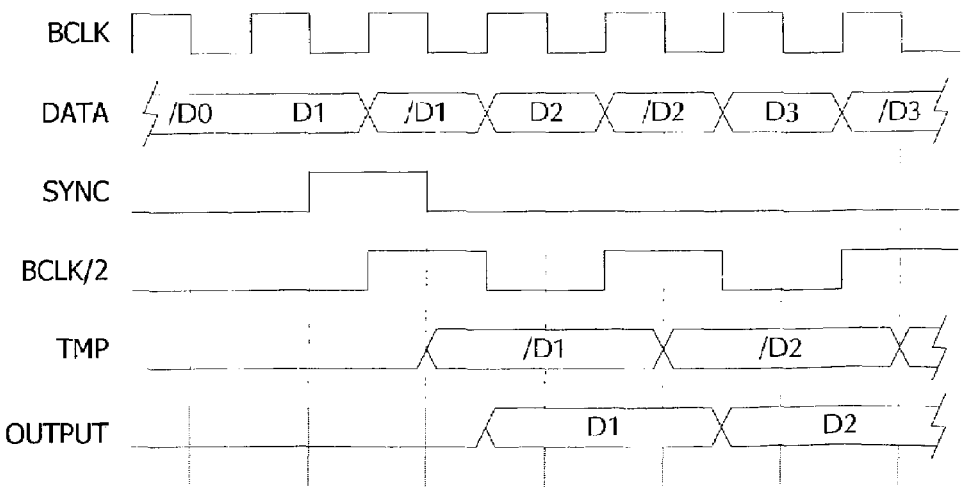
FIG. 8 is a timing diagram of the circuit of FIG. 7.

An exemplary circuit for generating the SYNC signal and storing the true data bits is shown in FIG. 7, and a corresponding timing diagram is shown in FIG. 8.

On reset, flop-flops 701–705 are all cleared. On each falling edge of BCLK, flip-flop 701 stores the current bit value on the DATA line. At the same time, equivalence gate 706 compares the current bit value with the previous bit value stored by flip-flop 701 on the preceding falling edge of BCLK. An equivalence gate is a circuit that provides a high or true output only if its inputs match, and provides a low or false output if its inputs do not match. The result of the comparison is stored by flip-flop 702 on the falling edge of BCLK. The net effect is that the output of flip-flop 702 goes high when the current bit and previous bit match, thereby generating the necessary SYNC signal.

The circuit of FIG. 7 is not a direct implementation of the FSM described by FIG. 6. FIG. 7 implements a state machine that omits state 601 of FIG. 6 and starts in state 604. As a result, the circuit may generate a false SYNC signal if the first bit received is a zero. However, the circuitry will resynchronize correctly when a pair of matching bits is received.

Flip-flop 703 is configured to provide an output at half the frequency of BLCK as described in connection with FIG. 4. However, the feedback path from the /Q output of flip-flop 703 is combined with the output of flip-flop 702 in OR gate 707. When the output of flip-flop 702 is high, flip-flop 703 is forced to be set so that its output is high. This event synchronizes BCLK/2 with the DSD bit stream.

Figure 4:
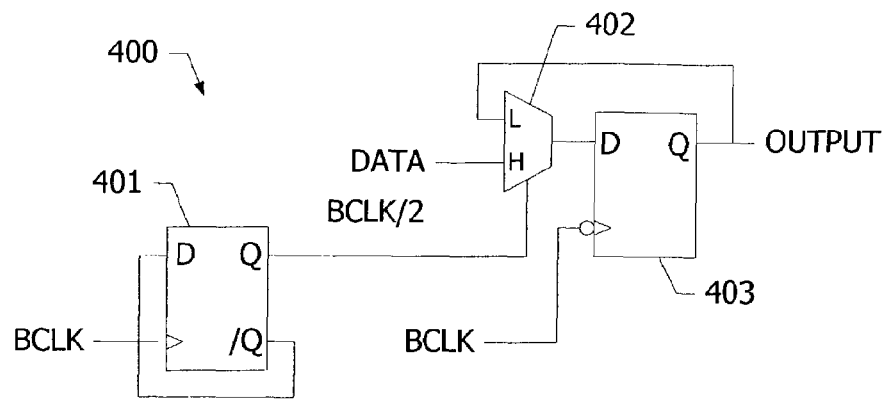
FIG. 4 is a simplified schematic of a circuit at the DAC subsystem of FIG. 1 for receiving a DSD bit stream using only bit clock BCLK.
Figure 5A:
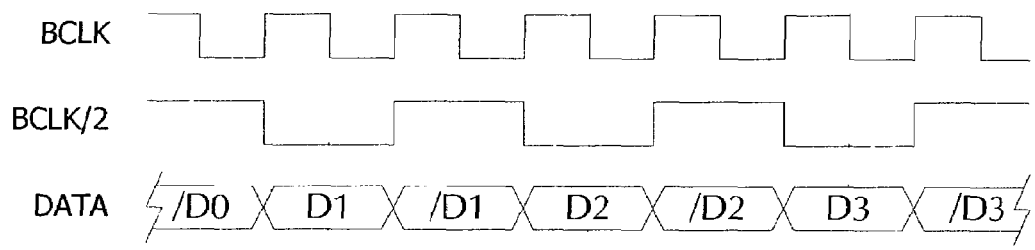
FIGS. 5a and 5b are timing diagrams showing the operation of the circuit of FIG. 4.
Figure 5B:
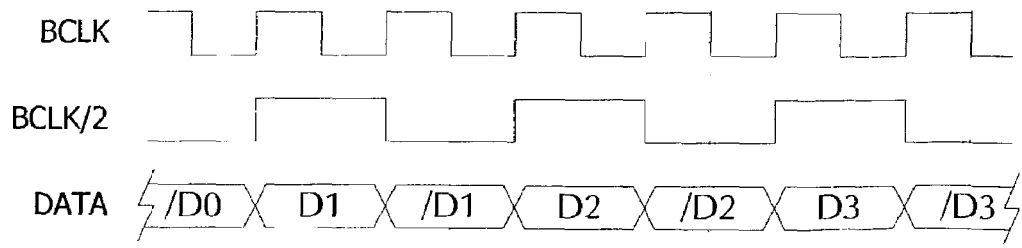

As in FIG. 4, multiplexor 708 alternately selects the current bit value and the previous bit value to pass through to the input of flip-flip 704. However, multiplexor 708 and flip-flop 704 are synchronized so as to store the inverted bit values, as shown in the timing diagram of FIG. 8. Flop-flop 705 is connected to the inverted output of flip-flop 704 and therefore provides the true bit values.

The circuit of FIG. 7 provides a mechanism to capture the DSD bit stream using only BCLK as a timing reference. The data bits themselves are monitored to differentiate a data bit from an inverted data bit and thereby synchronize a derived clock signal (BCLK/2) with the data stream so that the true data bits are obtained. In an alternative embodiment of the present invention, the phase clock PCLK is used to capture the DSD bit stream.

As described above, in the phase modulation mode, the data changes on every edge of the PCLK signal, alternating as a true data bit and an inverted data bit. Moreover, when PCLK is low, the true data is available. On the other hand, when PCLK is high, the inverted data is available. The difficulty is that according to the specification, the PCLK edge may occur anytime within a 20 ns window before or after the DATA line changes. As a result neither edge of PCLK may be used directly as a trigger to store the data bits.

Figure 9:
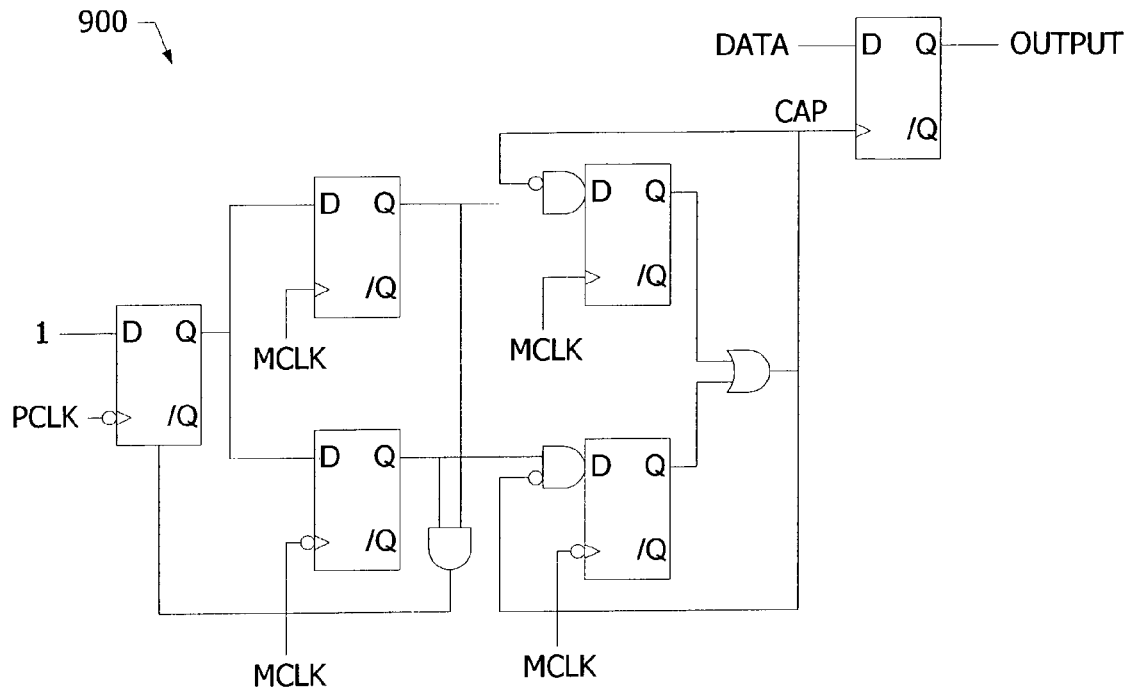
FIG. 9 is a schematic representation of a circuit for receiving at the DAC subsystem of FIG. 1 a DSD bit stream using only phase clock PCLK.
Figure 10:
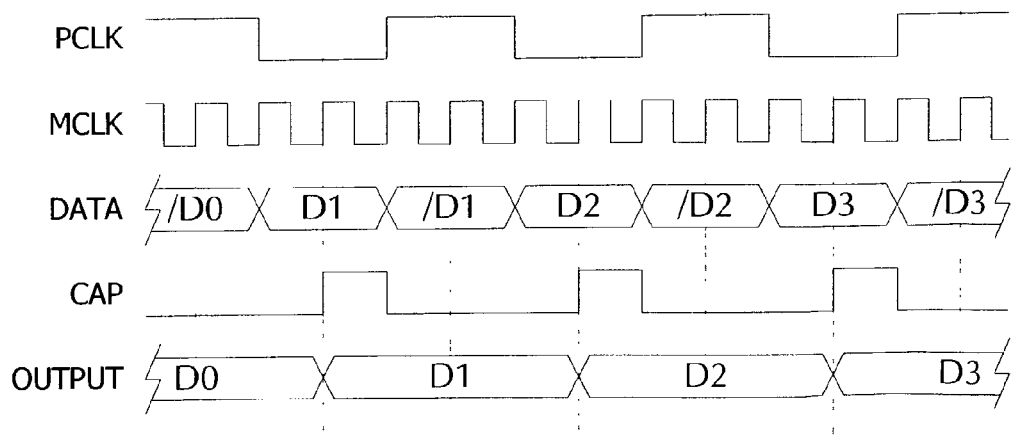
FIG. 10 is a timing diagram of the circuit of FIG. 9.

On many digital systems, a high speed clock is provided that runs at a higher frequency than BCLK and PCLK. Also, a high speed master clock or MCLK typically runs at a rate at least four times faster than PCLK. A retiming circuit, such as that shown in FIG. 9, is used to generate a timing pulse that is delayed with respect to a falling edge of the PCLK signal. As shown in the timing diagram of FIG. 10, the re-timing circuitry of FIG. 9 creates a capture signal CAP that has a pulse that is delayed by about one to one and a half cycle of MCLK relative to the negative edge of the PCLK signal. The rising edge of CAP is then used to store the data bits of the DSD bit stream.

The exact position of the CAP pulse depends on the frequency and phase relationship between MCLK and PCLK; however, the circuit of FIG. 9 ensures that the impulse is one MCLK cycle wide and that the leading edge of the pulse is delayed about 1 to 1.5 times the period of MCLK from the falling edge PCLK. As long as the pulse is at least 20 ns after a PCLK edge, the data is reliably read by the circuit of FIG. 9.

Although the invention has been described with reference to specific embodiments, these descriptions are not meant to be construed in a limiting sense. Various modifications of the disclosed embodiments as well as alternative embodiments of the invention will become apparent to persons skilled in the art upon reference to the description of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore, contemplated that the claims will cover any such modifications or embodiments that fall within the true scope of the invention.

What is claimed is:

1. A method for receiving a direct stream digital (DSD) bit stream transmitted in a phase modulation format using only one of a plurality of clock signals, wherein the plurality of clock signals comprise a bit clock signal and a phase clock signal, the method comprising:
   receiving the one of the plurality of clock signals and a DSD data signal;
   generating a capture signal responsive to the one of the plurality of clock signals, the capture signal indicating when the DSD data signal is valid; and
   storing the value of the DSD data signal responsive to the generated capture signal.

2. The method of claim 1 wherein the one of the plurality of clock signals is the bit clock signal (BCLK).

3. The method of claim 2 wherein generating the capture signal comprises:
   generating the capture signal having half the frequency of the bit clock; and
   synchronizing the capture signal with the DSD data signal.

4. The method of claim 3 further comprising:
   monitoring a DSD data line carrying the DSD bit stream;
   detecting an occurrence of two consecutive bits with the same value;
   generating a synchronization signal responsive to the detection of two consecutive bits with the same value; and
   wherein the synchronization signal synchronizes the capture signal with the DSD data signal.

5. The method of claim 4 wherein the capture signal is synchronized with the DSD data signal so that either only true data bits are captured or only inverted data bits are stored.

6. The method of claim 4 wherein monitoring the DSD data line comprises driving a finite state machine responsive to a sequence of values on the DSD data line.

7. The method of claim 6 wherein the finite state machine generates a synchronization signal when two consecutive bits of the same value occur.

8. The method of claim 1 wherein the one of the plurality of clock signals is the phase clock signal.

9. The method of claim 8 further comprising receiving a master clock signal having a frequency higher than a frequency of the phase clock signal.

10. The method of claim 8 wherein generating the capture signal comprises retiming an edge of the phase clock signal.

11. Circuitry for receiving a direct stream digital (DSD) bit stream transmitted in a phase modulation format using only one of a plurality of specified clock signals, wherein the plurality of specified clock signals comprise a bit clock signal and a phase clock signal, the circuitry comprising:
   a clock input for receiving the one of the plurality of specified clock signals;
   a data input for receiving a DSD data signal;
   circuitry for generating a capture signal responsive to the one of the plurality of specified clock signals, the capture signal indicating when the DSD data signal is valid; and
   a flip-flop for capturing the value of the DSD data signal responsive to the generated capture signal.

12. The circuitry of claim 11 wherein the one of the plurality of specified clock signals is the bit clock signal.

13. The circuitry of claim 12 wherein the circuitry for generating the capture signal comprises:
   circuitry for dividing the frequency of the bit clock signal; and
   circuitry for synchronizing the capture signal with the DSD data signal.

14. The circuitry of claim 13 further comprising:
   circuitry for monitoring a DSD data line carrying the DSD bit stream;
   circuitry for detecting an occurrence of two consecutive bits having the same value;
   circuitry for generating a synchronization signal responsive to the detection of two consecutive bits with the same value; and
   wherein the synchronization signal synchronizes the capture signal with the DSD data signal.

15. The circuitry of claim 14 wherein the capture signal is synchronized with the DSD data signal so that either only true data bits are captured or only inverted data bits are captured.

16. The circuitry of claim 4 wherein circuitry for monitoring the DSD data line comprises a finite state machine responsive to a sequence of values on the DSD data line.

17. The circuitry of claim 16 wherein the finite state machine generates a synchronization signal when two consecutive bits of the same value occurs.

18. The circuitry of claim 11 wherein the one of the plurality of specified clock signals is the phase clock signal.

19. The circuitry of claim 18 further comprising an input for accepting a master clock signal having a frequency higher than a frequency of the phase clock signal.

20. The circuitry of claim 18 wherein circuitry for generating the capture signal comprises circuitry for retiming an edge of the phase clock signal.

* * * * *